(12) United States Patent
Suzuki

(10) Patent No.: US 12,136,013 B2
(45) Date of Patent: Nov. 5, 2024

(54) WIRELESS TAG READING DEVICE, WIRELESS TAG READING METHOD, AND PROGRAM RECORDING MEDIUM

(71) Applicant: TOSHIBA TEC KABUSHIKI KAISHA, Tokyo (JP)

(72) Inventor: Yuki Suzuki, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 28 days.

(21) Appl. No.: 17/869,767

(22) Filed: Jul. 20, 2022

(65) Prior Publication Data

US 2022/0358298 A1    Nov. 10, 2022

Related U.S. Application Data

(63) Continuation of application No. PCT/JP2021/027094, filed on Jul. 20, 2021.

(30) Foreign Application Priority Data

Aug. 26, 2020 (JP) ................................ 2020-142636

(51) Int. Cl.
G06K 7/10    (2006.01)

(52) U.S. Cl.
CPC ..... *G06K 7/10356* (2013.01); *G06K 7/10366* (2013.01)

(58) Field of Classification Search
CPC ........................ G06K 7/10356; G06K 7/10366

(Continued)

(56) References Cited

U.S. PATENT DOCUMENTS 5,396,224 A * 3/1995 Dukes ..................... G07C 9/28
                                                        455/100
8,235,923 B2    8/2012 Avitable et al.
(Continued)

FOREIGN PATENT DOCUMENTS

CN        101441701 A    5/2009
EP          0543500 A2    5/1993
(Continued)

OTHER PUBLICATIONS

Machine translation of Miwa et al., JP 2001-359147 A, Dec. 26, 2001, 25 pages (Year: 2001).*

(Continued)

*Primary Examiner* — Paultep Savusdiphol
(74) *Attorney, Agent, or Firm* — Kim & Stewart LLP

(57) ABSTRACT

In one embodiment, a wireless tag reading device includes a plurality of antennas for wireless tag communication, a number-of-times acquisition unit, a strength acquisition unit, and a direction specifying unit. Each antenna is arranged along a passage through which a wireless tag passes. The number-of-times acquisition unit acquires a number of times of reading of data of the wireless tag read by each of the antennas for each unit time for each of the antennas. The strength acquisition unit acquires a received signal strength indicator when the data of the wireless tag is read by each of the antennas for each unit time for each of the antennas. The direction specifying unit specifies a moving direction of the wireless tag passing through the passage based on the number of times of reading and the received signal strength indicator for each of the antennas that are acquired for each unit time.

8 Claims, 9 Drawing Sheets

(58) Field of Classification Search
USPC .................................................. 235/492, 451
See application file for complete search history.

(56) References Cited

U.S. PATENT DOCUMENTS

| | | | |
|---|---|---|---|
| 10,262,172 B1* | 4/2019 | Niranjayan | ........ G06K 7/10326 |
| 10,446,941 B1* | 10/2019 | Kalam | .................... H01Q 21/28 |
| 10,650,346 B1 | 5/2020 | Pesavento et al. | |
| 2004/0070501 A1 | 4/2004 | Degrauwe et al. | |
| 2007/0279277 A1* | 12/2007 | Kuramoto | .............. H04B 7/086 |
| | | | 342/155 |
| 2008/0314667 A1 | 12/2008 | Hannah et al. | |
| 2010/0302010 A1 | 12/2010 | Iwahashi | |
| 2012/0119905 A1* | 5/2012 | Scalisi | .................... G01S 19/34 |
| | | | 340/539.13 |
| 2016/0349352 A1* | 12/2016 | Karani | .................. G01S 13/878 |

FOREIGN PATENT DOCUMENTS

| | | |
|---|---|---|
| JP | H05-233988 A | 9/1993 |
| JP | 2001-359147 A | 12/2001 |
| JP | 2009-007157 A | 1/2009 |
| JP | 2009-110088 A | 5/2009 |
| JP | 2009-129072 A | 6/2009 |
| JP | 2009-265993 A | 11/2009 |
| JP | 4876034 B | 2/2012 |
| JP | 4889049 B | 2/2012 |
| JP | 2013-058055 A | 3/2013 |
| KR | 20090052788 A | 5/2009 |

OTHER PUBLICATIONS

Machine translation of Ito et al. (JP 2009-129072 A), Jun. 11, 2009, 23 pages (Year: 2009).*

International Search Report dated Mar. 3, 2022, mailed in counterpart International Application No. PCT/JP2021/027094 and its English Translation, 5 pages.

English Translation of International Preliminary Report on Patentability (Chapter I) and Written Opinion mailed Mar. 9, 2023 in International Application No. PCT/JP2021/027094, 6 pages.

Notice of Reasons for Refusal mailed Aug. 6, 2024 in corresponding Japanese Patent Application No. 2020-142636, with Machine English Translation, 8 pages.

Extended European Search Report mailed Aug. 13, 2024 in corresponding European Patent Application No. 21861052.5, 8 pages.

* cited by examiner

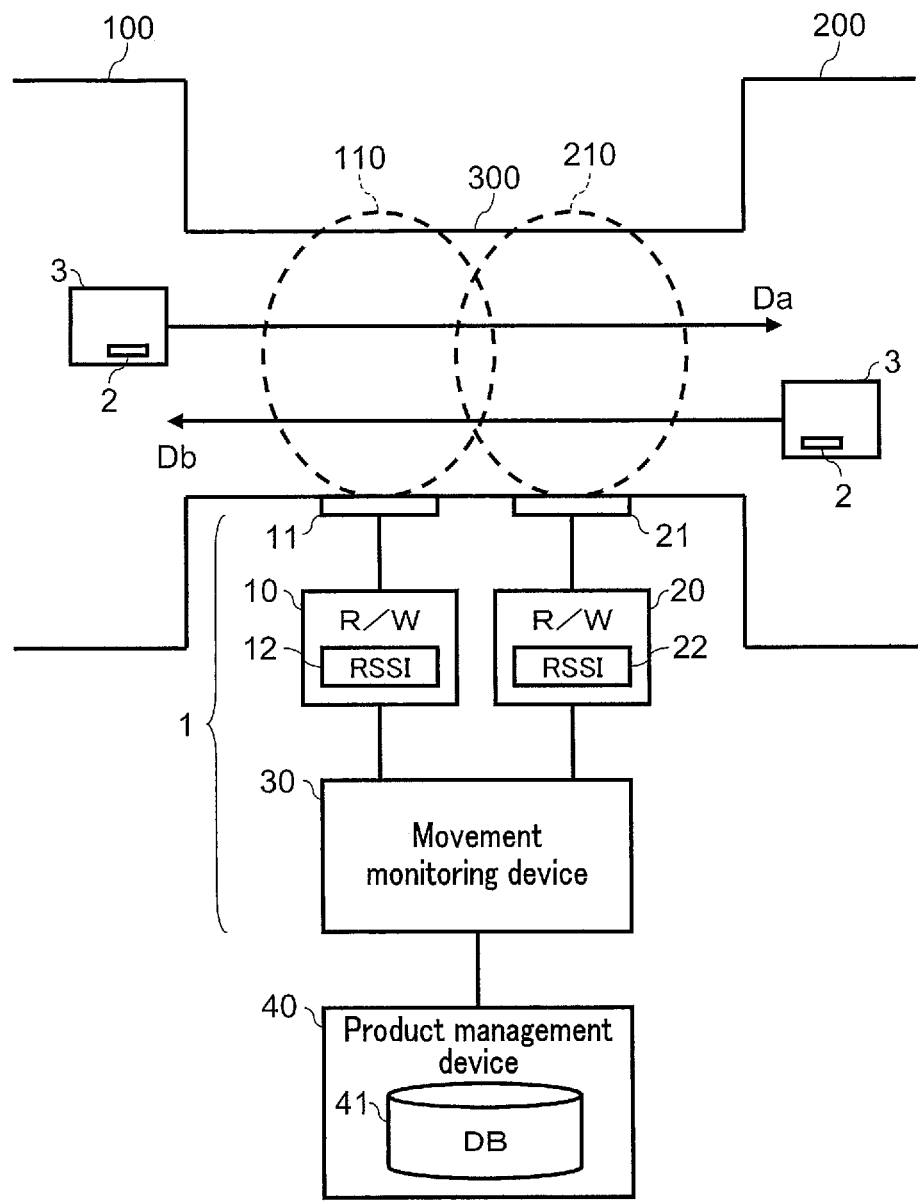
F I G. 1
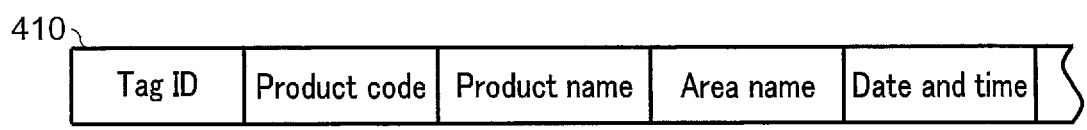
F I G. 2

| WBNo. | 1 | | |
|---|---|---|---|
| Tag ID | Antenna ID | Number of times of reading | Total RSSI |
|  |  |  |  |
|  |  |  |  |
|  |  |  |  |
| ⋮ | ⋮ | ⋮ | ⋮ |

| WBNo. | 2 | | |
|---|---|---|---|
| Tag ID | Antenna ID | Number of times of reading | Total RSSI |
|  |  |  |  |
|  |  |  |  |
|  |  |  |  |
| ⋮ | ⋮ | ⋮ | ⋮ |

F I G. 4

| Antenna ID | Area name |
|---|---|
| ANTa | Warehouse |
| ANTb | Sales floor |

| Time | Tag ID | Antenna ID | Status |
|---|---|---|---|
|  |  |  |  |
|  |  |  |  |
|  |  |  |  |
|  |  |  |  |
|  |  |  |  |
| ⋮ | ⋮ | ⋮ | ⋮ |

| Date and time | Tag ID | Area name |
|---|---|---|
|  |  |  |
|  |  |  |
|  |  |  |
|  |  |  |
|  |  |  |
| ⋮ | ⋮ | ⋮ |

F I G. 5

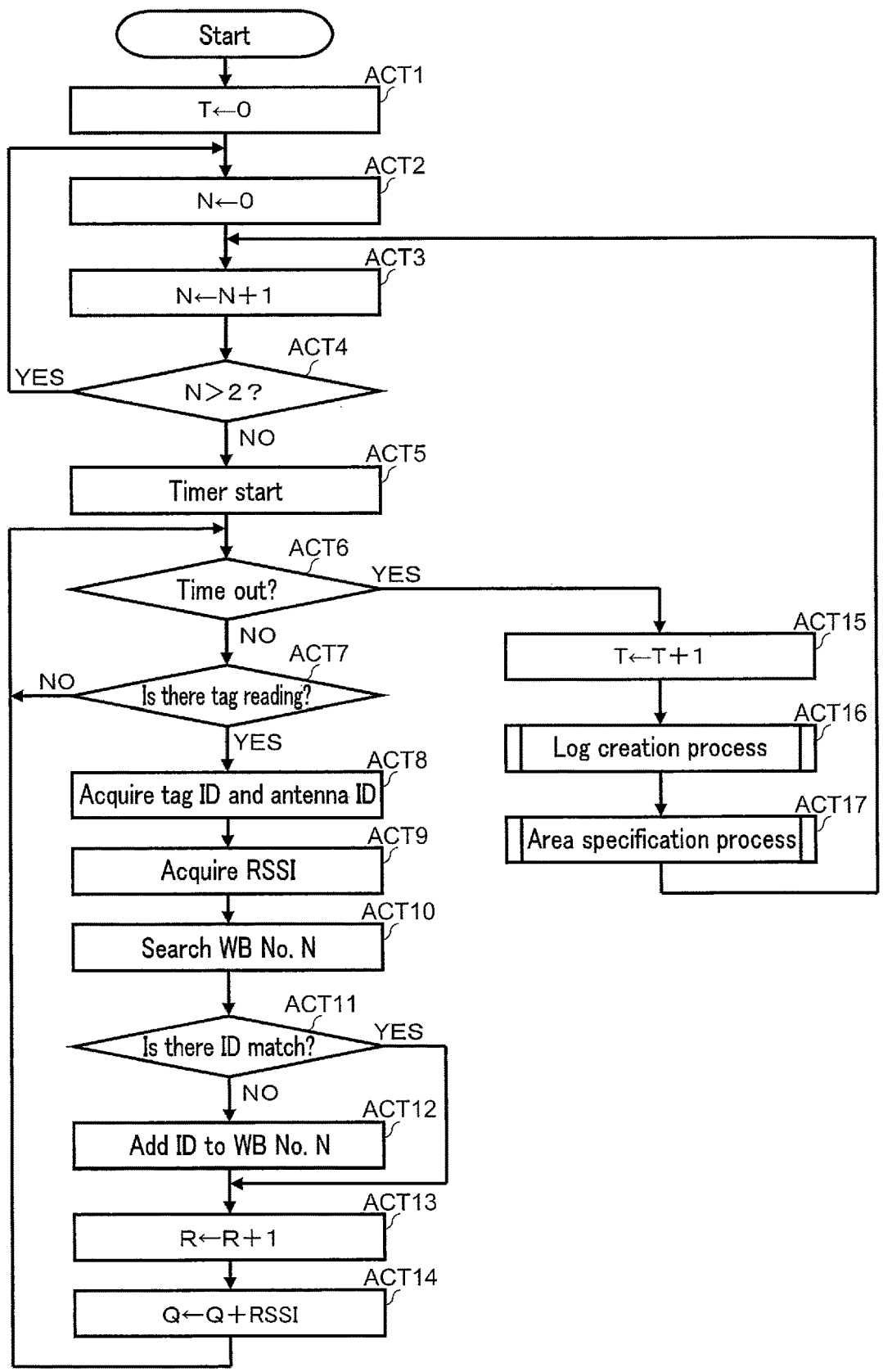
F I G. 6

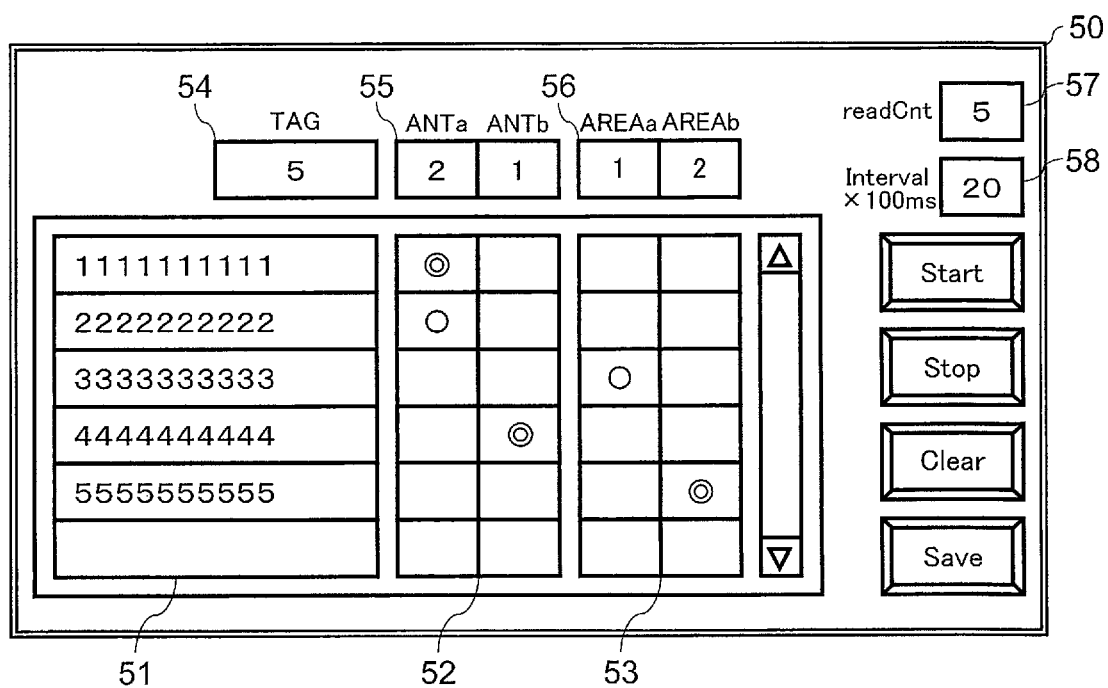
F I G. 10

WIRELESS TAG READING DEVICE, WIRELESS TAG READING METHOD, AND PROGRAM RECORDING MEDIUM

CROSS REFERENCE TO RELATED APPLICATIONS

This application is a Continuation Application of PCT Application No. PCT/JP2021/027094, filed Jul. 20, 2021 and based upon and claiming the benefit of priority from Japanese Patent Application No. 2020-142636, filed Aug. 26, 2020, the entire contents of all of which are incorporated herein by reference.

FIELD

Embodiments described herein relate generally to a wireless tag reading device, a wireless tag reading method, and a program recording medium.

BACKGROUND

There is already known a technology that arranges a plurality of antennas for wireless tag communication along a passage through which a wireless tag passes, and specifies a moving direction of the wireless tag from the time when each antenna communicates with the wireless tag or the number of times each antenna reads data of the wireless tag.

BRIEF DESCRIPTION OF THE DRAWINGS

FIG. 1 is a schematic diagram for explaining a wireless tag reading device according to an embodiment.

FIG. 2 is a schematic diagram showing a main data structure of a tag record stored in a tag database.

FIG. 4 is a configuration diagram of a work buffer formed in a main memory of the movement monitoring device.

FIG. 5 is a configuration diagram of a conversion table, a log file, and a confirmed file formed in an auxiliary storage device of the movement monitoring device.

FIG. 6 is a flowchart showing a key procedure of main information processing executed by a processor according to a control program.

FIG. 10 is a diagram showing one example of an image displayed on a display device of the movement monitoring device.

DETAILED DESCRIPTION

Figure 3:
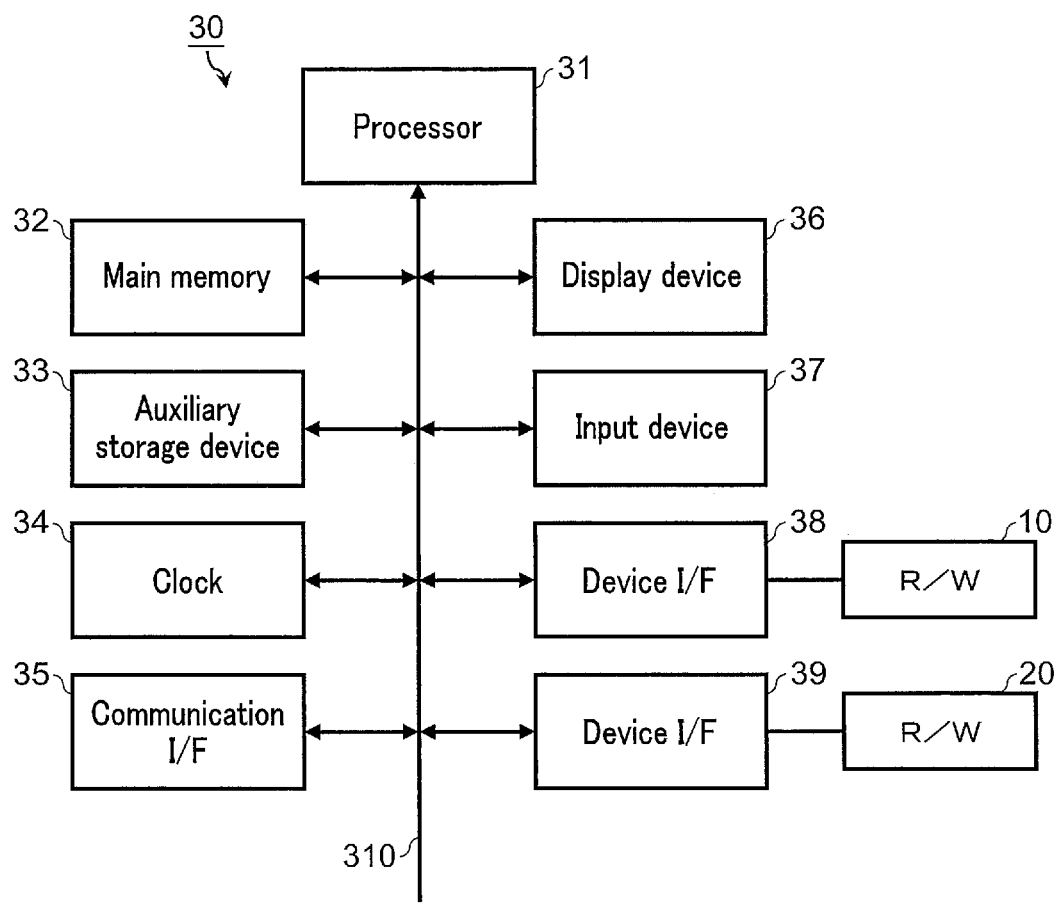
FIG. 3 is a block diagram showing a main circuit configuration of a movement monitoring device.

In one embodiment, a wireless tag reading device includes a plurality of antennas for wireless tag communication, a number-of-times acquisition unit, a strength acquisition unit, and a direction specifying unit. Each antenna is arranged along a passage through which a wireless tag passes. The number-of-times acquisition unit acquires a number of times of reading of data of the wireless tag read by each of the antennas for each unit time for each of the antennas. The strength acquisition unit acquires a received signal strength indicator when the data of the wireless tag is read by each of the antennas for each unit time for each of the antennas. The direction specifying unit specifies a moving direction of the wireless tag passing through the passage based on the number of times of reading and the received signal strength indicator for each of the antennas that are acquired for each unit time.

Hereinafter, an embodiment will be described with reference to the drawings.

FIG. 1 is a schematic diagram for describing a wireless tag reading device 1 according to an embodiment. The wireless tag reading device 1 has a function of specifying a moving direction of a wireless tag 2 that passes through a passage 300 connecting a first area 100 and a second area 200. Further, the wireless tag reading device 1 has a function of specifying an existence area of the wireless tag 2, i.e., whether the wireless tag 2 exists in the first area 100 or the second area 200, based on information related to the moving direction of the wireless tag 2.

In an embodiment, the wireless tag 2 is attached to a product 3. The product 3 may be a single product or a case containing a plurality of products. A product 3 in the first area 100 may move through the passage 300 in a direction indicated by an arrow Da in FIG. 1 to move to the second area 200. A product 3 in the second area 200 may move through the passage 300 in a direction indicated by an arrow Db in FIG. 1 to move to the first area 100.

For example, the first area 100 is a warehouse of a store, and the second area 200 is a sales floor of the same store. In this type of store, when putting out a product, a product 3 stored in the warehouse is transferred to the sales floor through the passage 300. A product 3 collected at the sales floor due to expiration, etc. is transferred to the warehouse through the passage. By communicating with the wireless tag 2 attached to the product 3, the wireless tag reading device 1 can acquire information on which direction the wireless tag 2 has moved through the passage 300, i.e., whether the product 3 has been transferred from the warehouse to the sales floor or from the sales floor to the warehouse, in units of the product 3.

The wireless tag reading device 1 having such a function includes two reader/writers (R/W) 10 and 20, two antennas 11 and 21 connected to the reader/writers 10 and 20, respectively, and a movement monitoring device 30.

Each of the antennas 11 and 21 is an antenna for reading a wireless tag. For example, circularly or linearly polarized planar antennas are used as the antennas 11 and 21. Each of the antennas 11 and 21 is arranged along the passage 300. In FIG. 1, one antenna 11 is arranged on the first area 100 side, and the other antenna 21 is arranged on the second area 200 side. Then, orientations, heights from the floor, radio wave output levels, Q values, etc. of the antennas 11 and 21 are set such that a wireless tag readable area 110 viewed from a top surface of one antenna 11 and a wireless tag readable area 210 viewed from a top surface of the other antenna 21 cover the entire width of the passage 300.

The reader/writers 10 and 20 read data stored in a memory of a wireless tag 2 that performs wireless communication via the corresponding antennas 11 and 21. At least a tag ID is stored in the memory of the wireless tag 2. The tag ID is tag identification information uniquely set for each wireless tag 2, and is also referred to as RFID (Radio Frequency Identification), etc.

The reader/writers 10 and 20 include RSSI (Received Signal Strength Indicator) measurement units 12 and 22 for measuring a received signal strength indicator. The RSSI measurement units 12 and 22 measure an electric field strength of a radio wave signal received by the corresponding antennas 11 and 21. That is, the RSSI measurement units 12 and 22 measure, as an RSSI, an electric field strength when a radio wave signal transmitted from a wireless tag 2 that receives a read radio wave radiated from the antennas 11 and 21 is received by the same antennas 11 and 21. Every time the reader/writers 10 and 20 read a tag ID from a wireless tag 2, the reader/writers 10 and 20 output an RSSI at the time of reading together with the tag ID to the movement monitoring device 30.

The movement monitoring device 30 is a computer device for monitoring a movement of a wireless tag 2 passing through the passage 300 based on a tag ID and an RSSI of the wireless tag 2 read by the reader/writers 10 and 20. The movement monitoring device 30 connects a product management device 40.

The product management device 40 is a computer device for managing an existence area of a product to which a wireless tag 2 is attached. The product management device 40 has a tag database (DB) 41. The tag database 41 is a collection of tag records 410 (see FIG. 2).

As shown in FIG. 2, the tag records 410 include items such as a tag ID, a product code, a product name, an area name, and a date and time. The product code and the product name are a code and a name unique to a product 3 with a wireless tag 2 that stores a tag ID as identification information. The area name is a name indicating an area in which the product 3 exists. For example, when the first area 100 is a warehouse and the second area 200 is a store, an area name of the tag record 410 of the product 3 existing in the warehouse is "warehouse". An area name of the tag record 410 of the product 3 existing in the store is "store". The date and time is date and time when the product 3 moves to the area of the area name. The area name and the date and time are appropriately updated according to movement information of the wireless tag 2 monitored by the movement monitoring device 30.

FIG. 3 is a block diagram showing a main circuit configuration of the movement monitoring device 30. The movement monitoring device 30 includes a processor 31, a main memory 32, an auxiliary storage device 33, a clock 34, a communication interface (I/F) 35, a display device 36, an input device 37, and two device interfaces 38 and 39. The movement monitoring device 30 connects the processor 31 with the main memory 32, the auxiliary storage device 33, the clock 34, the communication interface 35, the display device 36, the input device 37, and the two device interfaces 38 and 39 by a system bus 310. The system bus 310 includes an address bus, a data bus, etc. The movement monitoring device 30 constitutes a computer by connecting the processor 31 with the main memory 32, the auxiliary storage device 33, the clock 34, and the communication interface 35 by the system bus 310.

The processor 31 corresponds to a central portion of the above computer. The processor 31 controls each unit in order to realize various functions as the movement monitoring device 30 according to an operating system or an application program. The processor 31 may be, for example, processing circuitry such as a central processing unit (CPU), a graphics processing unit (GPU), an application specific integrated circuit (ASIC), a programmable logic device (e.g., a simple programmable logic device (SPLD), a complex programmable logic device (CPLD), and a field programmable gate array (FPGA)), etc. The processor 31 is not limited to a case in which it is formed as a single processing circuit, and a plurality of processing circuits may be combined into the processor 31.

The main memory 32 corresponds to a main storage portion of the above computer. The main memory 32 includes a non-volatile memory area and a volatile memory area. The main memory 32 stores an operating system or an application program in the non-volatile memory area. The main memory 32 stores data necessary for the processor 31 to execute processing for controlling each unit in the volatile memory area. Further, the main memory 32 uses the volatile memory area as a work area where data is appropriately rewritten by the processor 31. The non-volatile memory area is, for example, a ROM (Read Only Memory). The volatile memory area is, for example, a RAM (Random Access Memory).

The auxiliary storage device 33 corresponds to an auxiliary storage portion of the above computer. As the auxiliary storage device 33, for example, a well-known storage device such as an EEPROM (Electric Erasable Programmable Read-Only Memory), an HDD (Hard Disc Drive), or an SSD (Solid State Drive) can be used alone or in a combination of two or more. The auxiliary storage device 33 stores data used when the processor 31 performs various processing, data generated by the processing of the processor 31, etc. The auxiliary storage device 33 may store an application program.

The application program that the main memory 32 or the auxiliary storage device 33 stores includes a control program to be described later. A method for installing the control program in the main memory 32 or the auxiliary storage device 33 is not particularly limited. It is possible to install the control program in the main memory 32 or the auxiliary storage device 33 by recording the control program in a removable recording medium or delivering the control program through communication via a network. The recording medium may be any medium as long as it can store a program such as a CD-ROM or a memory card and can be read by a computer, and its form is not limited.

The clock 34 functions as a time information source of the movement monitoring device 30. The processor 31 acquires a current date and time based on time information measured by the clock 34.

The communication interface 35 connects the product management device 40. The movement monitoring device 30 performs data communication with the product management device 40 via the communication interface 35.

The display device 36 is a device for displaying an image related to movement monitoring of a wireless tag 2. The display device 36 is, for example, a liquid crystal display. The input device 37 is a device for inputting data related to movement monitoring of a wireless tag 2. The input device 37 is, for example, a keyboard, a mouse, etc. The movement monitoring device 30 may be provided with a monitoring device having a touch panel function as a device used concurrently with the input device 37 and the display device 36.

Two device interfaces 38 and 39 connect the reader/writers 10 and 20, respectively. The movement monitoring device 30 performs communication with the reader/writer 10 via the device interface 38. The movement monitoring device 30 acquires a tag ID and an RSSI of a wireless tag 2 read by the reader/writer 10 via the device interface 38. The movement monitoring device 30 also performs communication with the reader/writer 20 via the device interface 39. The movement monitoring device 30 acquires a tag ID and an RSSI of a wireless tag 2 read by the reader/writer 20 via the device interface 39.

The movement monitoring device 30 having such a configuration forms a pair of work buffers 321 and 322 in the volatile area of the main memory 32 as shown in FIG. 4. The movement monitoring device 30 then sets "1" as a work buffer number (WB No.) for one work buffer 321, and sets "2" as a work buffer number for the other work buffer 322. Note that the number of work buffers 321 and 322 is not limited to two. The movement monitoring device 30 may include three or more work buffers, and set consecutive numbers starting from "1" as work buffer numbers to the respective work buffers.

Each of the work buffers 321 and 322 is an area for temporarily storing a data record consisting of items of a tag ID, an antenna ID, the number of times of reading, and a total RSSI. Both the work buffers 321 and 322 can store a plurality of data records.

The antenna ID is a code set for each antenna in order to identify each of the antennas 11 and 21. The antenna ID of the antenna 11 is set in the memory of the reader/writer 10. The reader/writer 10 attaches the antenna ID of the antenna 11 to a tag ID of a wireless tag 2 read via the antenna 11, and outputs the tag ID to the movement monitoring device 30. The antenna ID of the antenna 21 is set in the memory of the reader/writer 20. The reader/writer 20 attaches the antenna ID of the antenna 21 to a tag ID of a wireless tag 2 read via the antenna 21, and outputs the tag ID to the movement monitoring device 30.

The number of times of reading is the number of times a tag ID is read by the antenna 11 or 21 corresponding to an antenna ID within a unit time. The total RSSI is a sum of RSSIs when a tag ID is read that number of times of reading.

As shown in FIG. 5, the movement monitoring device 30 has a conversion table 331, a log file 332, and a confirmed file 333 as a part of the area of the auxiliary storage device 33.

The conversion table 331 is a data table in which an area name is set in association with each antenna ID of the antennas 11 and 21. As described above, with respect to the passage 300, the antenna 11 is arranged on the first area 100 side, and the antenna 21 is arranged on the second area 200 side. In the present embodiment, the first area 100 is a warehouse, and the second area 200 is a sales floor. Therefore, the conversion table 331 sets the area name "warehouse" in association with the antenna ID (ANTa) of the antenna 11, and sets the area name "sales floor" in association with the antenna ID (ANTb) of the antenna 21.

The log file 332 is an area for describing a data record composed of items of time, tag ID, antenna ID, and status. The confirmed file 333 is an area for describing a data record composed of items of date and time, tag ID, and area name. Details of the data records described in the log file 332 and the confirmed file 333 will be clarified in an operation description to be provided later.

FIGS. 6 to 9 are flowcharts showing key procedures of main information processing executed by the processor 31 according to a control program. Hereinafter, a main operation of the processor 31 will be described with reference to each drawing. An operation procedure described below is an example. If the same effect can be obtained, the procedure can be changed as appropriate.

When a control program is activated, the processor 31 first resets a first counter T to "0" as ACTT. Further, the processor 31 resets a second counter N to "0" as ACT2. The first counter T and the second counter N are formed, for example, in the volatile area of the main memory 32.

The processor 31 counts up the second counter N by "1" as ACT3. Then, the processor 31 confirms whether or not the second counter N exceeds the maximum value "2" of the work buffer number as ACT4. If the second counter N does not exceed the maximum value "2" of the work buffer number, the processor 31 determines NO in ACT4 and proceeds to ACT5. If the second counter N does exceed the maximum value "2" of the work buffer number, the processor 31 determines YES in ACT4 and returns to ACT2. Then, the processor 31 resets the second counter N once to "0", counts up by "1" again, and proceeds to ACT4. Therefore, in this case, since the second counter N is "1", the processor 31 proceeds to ACT5. As described above, the processor 31 proceeds to ACT5 if the second counter N is "1" or "2", i.e., a numerical value that exists as a work buffer number.

The processor 31 starts a timer as ACT5. The timer is, for example, a soft timer in which 2 seconds is set as a time-out time and which restarts each time a time-out occurs.

The processor 31 monitors as ACT6 whether or not the timer is timed out. If the timer is not timed out, the processor 31 confirms whether or not a wireless tag is read by the reader/writers 10 and 20 as ACT7. If a wireless tag is not read, the processor 31 determines NO in ACT7 and returns to ACT6. Here, the processor 31 waits for the timer to time out or a tag ID to be read in ACT6 and ACT7.

In this standby state, when read data of a wireless tag read by the reader/writers 10 and 20 is received via the device interfaces 38 and 39, the processor 31 determines YES in ACT7 and proceeds to ACT8.

As described above, the read data of the wireless tag output from the reader/writers 10 and 20 to the movement monitoring device 30 includes a tag ID, an antenna ID, and an RSSI. The processor 31 acquires the tag ID and the antenna ID from the read data as ACT8. The processor 31 also acquires the RSSI from the read data as ACT9.

The processor 31 searches the work buffers 321 and 322 having the value of the second counter N as the work buffer number as ACT10. In the following, a case in which the value of the second counter N is "1", i.e., in which the work buffer 321 is searched, will be illustrated. In a case where the value of the second counter N is "2", i.e., the work buffer 322 is searched, the work buffer 321 to be searched in the following description may be replaced with the work buffer 322.

The processor 31 searches the work buffer 321 to be searched by using the tag ID and the antenna ID acquired from the read data as search keys. Then, the processor 31 confirms whether or not a data record including the tag ID and the antenna ID used as the search keys exists in the work buffer 321 to be searched. In the following, a data record including a tag ID and an antenna ID used as search keys will be referred to as a target data record.

If the target data record does not exist, the processor 31 determines NO in ACT11 and proceeds to ACT12. The processor 31 adds a data record including a tag ID and an antenna ID as search keys, i.e., a target data record, to the work buffer 321 to be searched as ACT12. After that, the processor 31 proceeds to ACT13. If the target data record exists in the work buffer 321 to be searched, the processor 31 determines YES in ACT11, skips the process of ACT12, and proceeds to ACT13.

The processor 31 increases the number of times of reading R of the target data record by "1" as ACT13. Further, the processor 31 adds the RSSI acquired from the read data to a total RSSI Q of the target data record as ACT14. If the above processes are completed, the processor 31 returns to ACT6.

In this way, the processor 31 repeatedly executes the processes of ACT8 to ACT14 each time the data of the wireless tag 2 is read by the reader/writers 10 and 20 within a unit time until the timer times out. Then, if the timer times out, the processor 31 determines YES in ACT6 and proceeds to ACT15.

The processor 31 counts up the first counter T by "1" as ACT15. Then, the processor 31 executes a log creation process as ACT16. Further, the processor 31 executes an area specification process as ACT17. The log creation process and the area specification process will be described later.

If the processor 31 finishes the log creation process and the area specification process, the processor 31 returns to ACT3. That is, the processor 31 counts up the second counter N by "1". Therefore, if the second counter N is "1", the processor 31 sets the second counter N to "2". If the second counter N is "2", the processor 31 sets the second counter N to "1". The processor 31 then executes the processes of ACT5 and the subsequent steps in the same manner as described above. Therefore, when the work buffer to be searched is the work buffer 321 in the previous processing, the work buffer 322 is set as the search target in the current processing.

In this way, in the work buffers 321 and 322 that are the search targets, a tag ID of a wireless tag 2 read within a unit time until a timer times out, an antenna ID of the reader/writers 10 and 20 that read that tag ID, the number of times of reading of that tag ID, and a total value of RSSIs (a total RSSI) when that tag ID is read, are stored.

Figure 7:
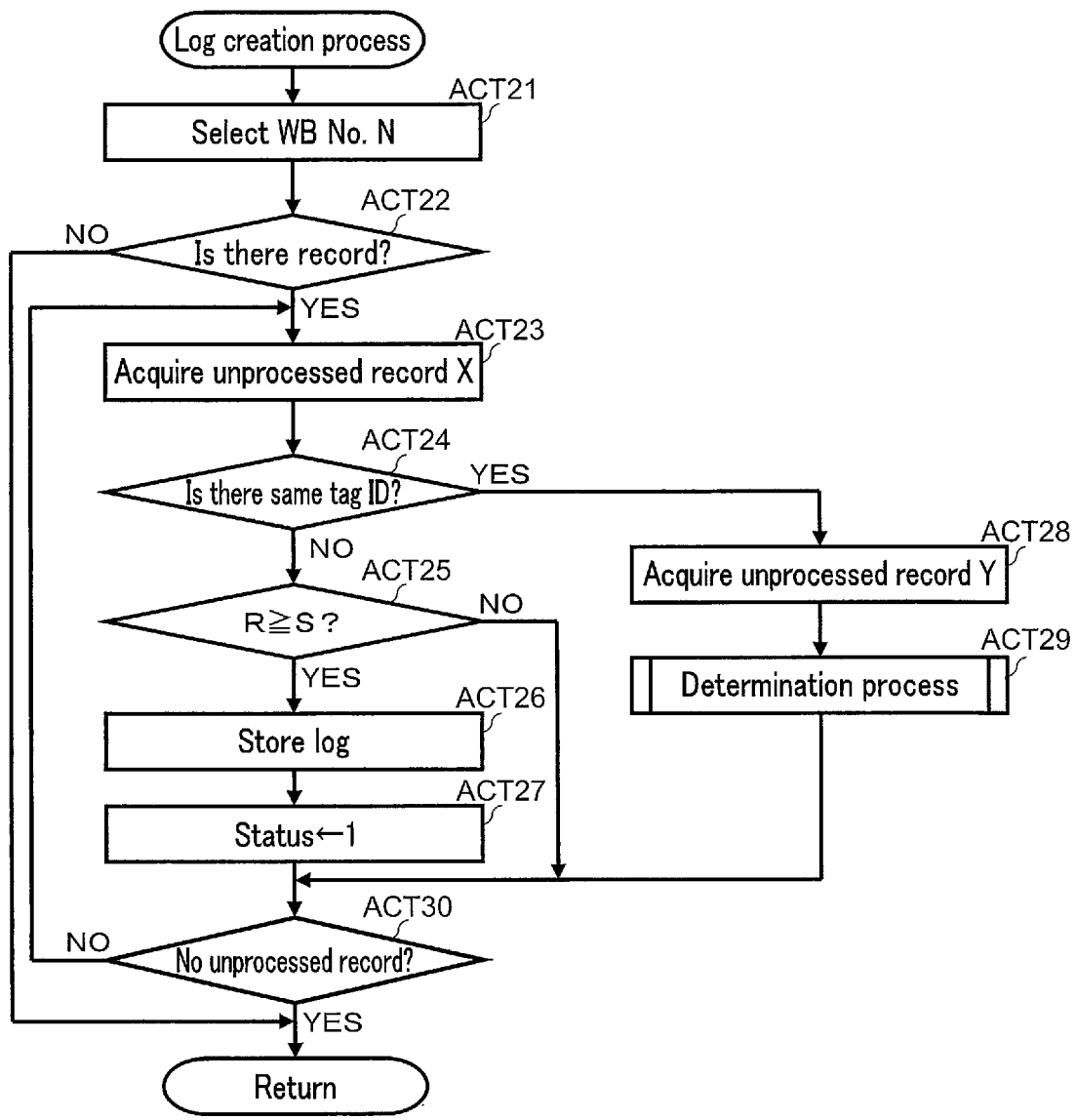
FIG. 7 is a flowchart showing a specific procedure of a log creation process in FIG. 6.

FIG. 7 is a flowchart showing a key procedure of a log creation process. Upon entering the log creation process, the processor 31 selects the work buffer 321 or 322 whose work buffer number is the value of the second counter N as ACT21. That is, the processor 31 selects the work buffer 321 if the second counter N is "1". If the second counter N is "2", the processor 31 selects the work buffer 322. In the following, a case in which the work buffer 321 is selected will be illustrated. In a case where the work buffer 322 is selected, the work buffer 321 to be selected in the following description may be replaced with the work buffer 322.

The processor 31 confirms whether or not a data record is stored in the work buffer 321 to be selected as ACT22. If no data record is stored in the work buffer 321 to be selected, the processor 31 determines NO in ACT22. The processor 31 exits the log creation process.

If at least one data record is stored in the work buffer 321 to be selected, the processor 31 determines YES in ACT22 and proceeds to ACT23. The processor 31 acquires a data record on which a log creation process is not performed from the work buffer 321 to be selected as ACT23. In the following, the acquired unprocessed data record will be referred to as an unprocessed record X. The processor 31 confirms whether or not another unprocessed data record including a tag ID of the unprocessed record X is stored in the work buffer 321 to be selected as ACT24.

If data of a wireless tag 2 moving through the passage 300 can be read by only one of the reader/writers 10 and 20 within the latest unit time, there is only one data record including the tag ID of that wireless tag 2 in the work buffer 321. In this case, the processor 31 determines NO in ACT24, and proceeds to ACT25. The processor 31 confirms whether or not the number of times of reading R of that data record is equal to or greater than a threshold value S as ACT25.

For example, the reader/writers 10 and 20 may read the data of the wireless tag 2 located outside the wireless tag readable areas 110 and 210 due to irregular reflection of radio waves, etc. However, since such erroneous reading is sporadic, it would not occur a predetermined number of times within a unit time. Therefore, this predetermined number of times is set as the threshold value S. If the number of times of reading R is less than the threshold value S, the processor 31 discards the data record as being caused by erroneous reading. That is, the processor 31 determines NO in ACT25, skips the processes of ACT26 and ACT27, and proceeds to ACT30.

If the number of times of reading R is equal to or greater than the threshold value S, the processor 31 determines YES in ACT25, and proceeds to ACT26. The processor 31 creates log data, and stores it in the log file 332, as ACT26. A time of the log data is the value of the first counter T. A tag ID and an antenna ID are data of the unprocessed record X. The processor 31 sets a status of that log data to "1" as ACT27. After that, the processor 31 proceeds to ACT30.

On the other hand, if both the reader/writers 10 and 20 read the data of the wireless tag 2 moving through the passage 300 within the latest unit time, there are two data records including the tag ID of that wireless tag 2 in the work buffer 321. In this case, the processor 31 determines YES in ACT24, and proceeds to ACT28. The processor 31 acquires another data record including the tag ID of the unprocessed record X from the work buffer 321 to be selected as ACT28. In the following, another acquired data record will be referred to as an unprocessed record Y. The processor 31 executes a determination process using the unprocessed record X and the unprocessed record Y as ACT29.

Figure 8:
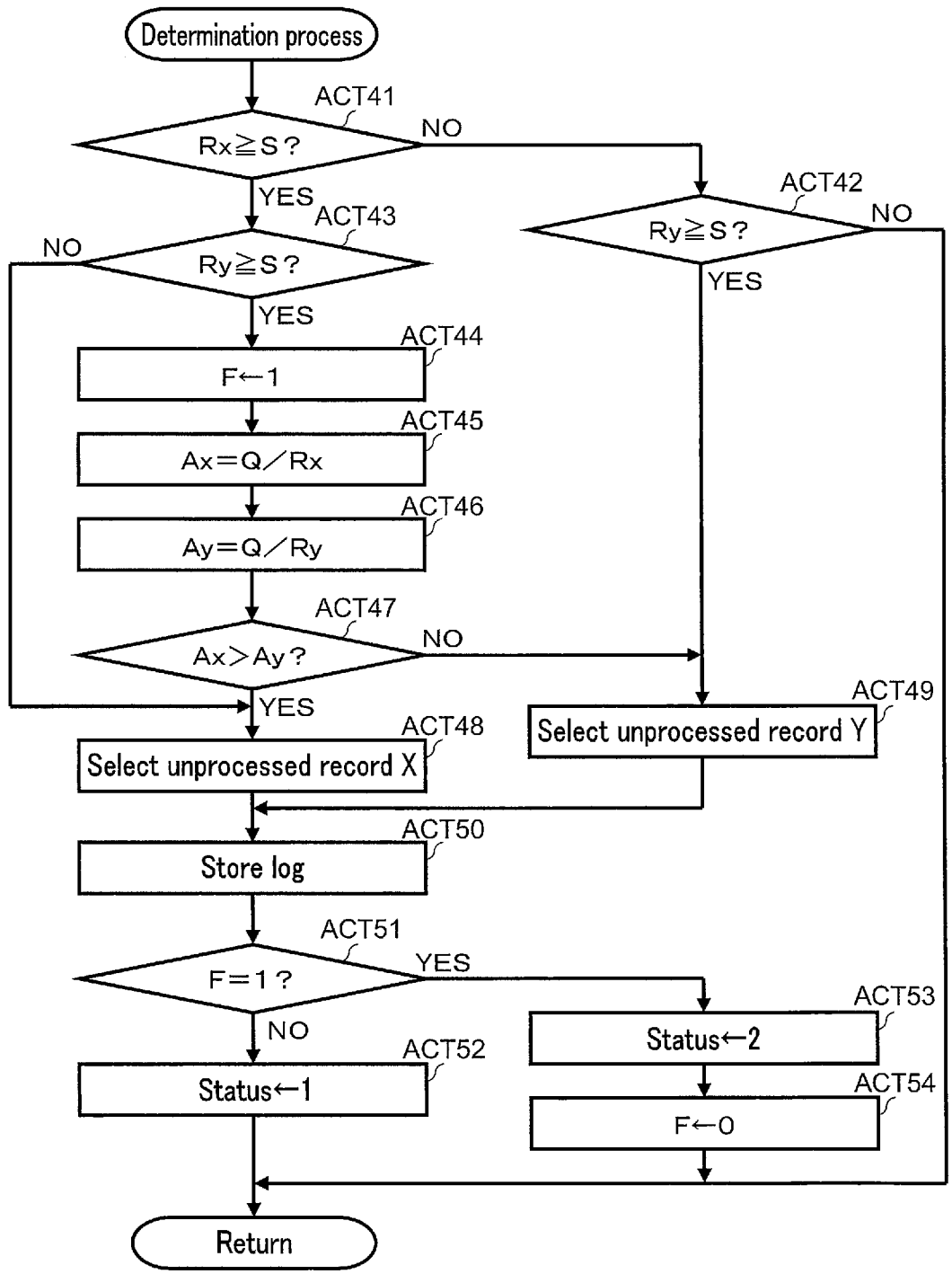
FIG. 8 is a flowchart showing a specific procedure of a determination process in FIG. 7.

FIG. 8 is a flowchart showing a key procedure of a determination process. Upon entering the determination process, the processor 31 confirms whether or not the number of times of reading Rx of the unprocessed record X is equal to or greater than the threshold value S as ACT41. If the number of times of reading Rx is less than the threshold value S, the processor 31 determines NO in ACT41 and proceeds to ACT42. The processor 31 confirms whether or not the number of times of reading Ry of the unprocessed record Y is equal to or greater than the threshold value S as ACT42. If the number of times of reading Ry is also less than the threshold value S, the processor 31 determines NO in ACT42 and exits the determination process. On the other hand, if the number of times of reading Ry is equal to or greater than the threshold value S, the processor 31 determines YES in ACT42, and proceeds to ACT49. The processes of ACT49 and the subsequent steps will be described later.

If the number of times of reading Rx is equal to or greater than the threshold value S, the processor 31 determines YES in ACT41 and proceeds to ACT43. The processor 31 confirms whether or not the number of times of reading Ry of the unprocessed record Y is equal to or greater than the threshold value S as ACT43. If the number of times of reading Ry is less than the threshold value S, the processor 31 determines NO in ACT43, skips the processes of ACT44 to ACT47, and proceeds to ACT48.

If the number of times of reading Ry is also equal to or greater than the threshold value S, the processor 31 determines YES in ACT43 and proceeds to ACT44. The processor 31 sets a processing flag F to "1" as ACT44. The processing flag F is, for example, 1-bit data stored in the volatile area of the main memory 32.

The processor 31 divides a total RSSI Q of the unprocessed record X by the number of times of reading Rx of the same unprocessed record X as ACT45. That is, the processor 31 calculates an RSSI average value Ax when the tag ID of the wireless tag 2 is read by one reader/writer, e.g., the reader/writer 10, within the unit time.

The processor 31 divides a total RSSI Q of the unprocessed record Y by the number of times of reading Ry of the same unprocessed record Y as ACT46. That is, the processor 31 calculates an RSSI average value Ay when a tag ID of the same wireless tag 2 is read by the other reader/writer, e.g., the reader/writer 20, within the unit time.

The processor 31 compares the average value Ax and the average value Ay as ACT47. As a result, if the average value Ax is greater than the average value Ay, the processor 31 determines YES in ACT47 and proceeds to ACT48. If the average value Ay is equal to or greater than the average value Ax, the processor 31 determines NO in ACT47 and proceeds to ACT49.

As described above, if the number of times of reading Rx of the unprocessed record X is equal to or greater than the threshold value S and the number of times of reading Ry of the unprocessed record Y is less than the threshold value S, the processor 31 proceeds to ACT48. If the number of times of reading Ry of the unprocessed record Y is equal to or greater than the threshold value S and the number of times of reading Rx of the unprocessed record X is less than the threshold value S, the processor 31 proceeds to ACT49. If the numbers of times of reading Rx and Ry of the unprocessed record X and the unprocessed record Y are both equal to or greater than the threshold value S, the processor 31 compares the RSSI average value Ax calculated from the unprocessed record X and the RSSI average value Ay calculated from the unprocessed record Y. Then, if the average value Ax is greater than the average value Ay, the processor 31 proceeds to ACT48. If the average value Ay is equal to or greater than the average value Ax, the processor 31 proceeds to ACT49.

In ACT48, the processor 31 selects the unprocessed record X. In ACT49, the processor 31 selects the unprocessed record Y. Then, when the process of ACT48 or ACT49 is completed, the processor 31 proceeds to ACT50.

The processor 31 creates log data using the selected unprocessed record X or unprocessed record Y, and stores the log data in the log file 332, as ACT50. A time of the log data is the value of the first counter T. A tag ID and an antenna ID are data of the unprocessed record X or the unprocessed record Y.

The processor 31 examines the processing flag F as ACT51. Here, if the processing flag F is not set to "1", the processor 31 determines NO in ACT51 and proceeds to ACT52. As ACT52, the processor 31 sets the status of the log data stored in the log file 332 in the process of ACT50 to "1". After that, the processor 31 exits the determination process.

If the processing flag F is set to "1", the processor 31 determines YES in ACT51 and proceeds to ACT53. As ACT53, the processor 31 sets the status of the log data stored in the log file 332 in the process of ACT50 to "2". Further, the processor 31 resets the processing flag F to "0" as ACT53. After that, the processor 31 exits the determination process.

In this way, in the log creation process, log data is created based on a data record whose number of times of reading R is equal to or greater than the threshold value S among the data records stored in the work buffer 321 to be selected, and is stored in the log file 332. At this time, if a tag ID whose number of times of reading R in the reader/writer 10 is equal to or greater than the threshold value S is not read by the threshold value S number of times or more in the reader/writer 20, an antenna ID of the log data is for the antenna 11. In contrast, if a tag ID whose number of times of reading R in the reader/writer 20 is equal to or greater than the threshold value S is not read by the threshold value S number of times or more in the reader/writer 10, an antenna ID of the log data is for the antenna 21. Further, the status of the log data is "1" in each case.

On the other hand, if the same tag ID is read by both the reader/writers 10 and 20 by the threshold value S number of times or more, the RSSI average values Ax and Ay are compared. Then, the antenna ID for the antenna 11 or 21 of the reader/writer 10 or 20 that has the larger average value Ax or Ay is included in the log data. The status of the log data is "2".

Thus, in the log file 332, the log data created by the log creation process executed for each unit time is stored in chronological order. This log data means that a wireless tag 2 identified by a tag ID is located in the wireless tag readable area 110 or 120 of the antenna 11 or 21 identified by an antenna ID at time T.

Therefore, by analyzing this log data in chronological order, a moving direction of a wireless tag 2 in the passage 300 is detected. That is, it can be detected whether the wireless tag 2 moves from the wireless tag readable area 110 of the antenna 11 to the wireless tag readable area 210 of the antenna 21, i.e., whether it moves in the direction indicated by the arrow Da in FIG. 1, or whether it moves from the wireless tag readable area 210 of the antenna 21 to the wireless tag readable area 110 of the antenna 11, i.e., whether it moves in the direction indicated by the arrow Db in FIG. 1.

Figure 9:
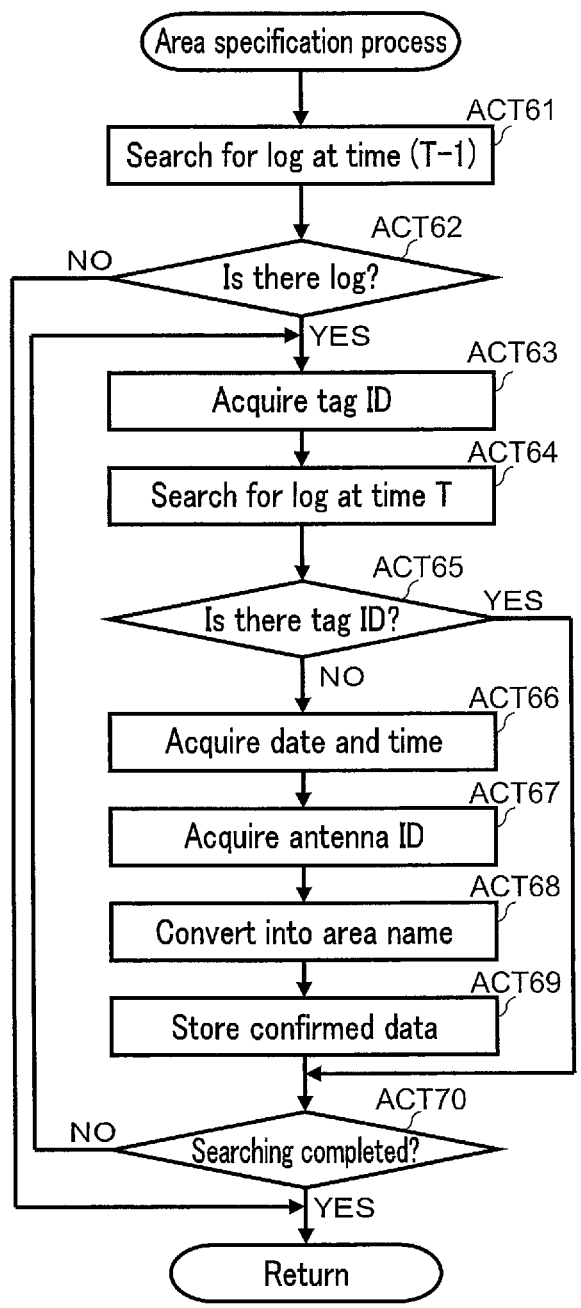
FIG. 9 is a flowchart showing a specific procedure of an area specification process in FIG. 6.

FIG. 9 is a flowchart showing a key procedure of an area specification process. Upon entering the area specification process, the processor 31 searches the log file 332 as ACT61. Then, the processor 31 confirms whether or not the log data at time (T−1) smaller than the value of the first counter T by "1" is stored as ACT62. Hereinafter, the log data at time (T−1) will be referred to as first target log data. If the first target log data is not stored in the log file 332, the processor 31 determines NO in ACT62. The processor 31 exits the area specification process.

If the first target log data is stored in the log file 332, the processor 31 determines YES in ACT62 and proceeds to ACT63. The processor 31 acquires a tag ID from the first target log data as ACT63. Then, the processor 31 searches the log file 332 using this tag ID as a search key as ACT64. The processor 31 then confirms whether or not log data having the value of the first counter T as a time is stored as ACT64. In the following, the log data at time T will be referred to as second target log data. If the second target log data is stored in the log file 332, the processor 31 determines YES in ACT65. The processor 31 skips the processes of ACT66 to ACT69, and proceeds to ACT70.

If the second target log data is not stored in the log file 332, the processor 31 determines NO in ACT65. The processor 31 executes the processes of ACT66 to ACT69, and proceeds to ACT70.

That is, the processor 31 acquires date and time data clocked by the clock 34 as ACT66. Further, the processor 31 acquires an antenna ID from the first target log data as ACT67. Then, the processor 31 refers to the conversion table 331, and converts that antenna ID into an area name, as ACT68. After that, the processor 31 stores confirmation data in the confirmed file 333 as ACT69. Date and time of the confirmed data is date and time data acquired by the process of ACT66. A tag ID is the tag ID of the first target log data. An area name is the area name converted from the antenna ID in the process of ACT68.

The processor 31 confirms whether or not the search of the log file 332 is completed as ACT70. If the search of the log file 332 is not completed, that is, if another first target log data is stored in the log file 332, the processor 31 determines NO in ACT 70 and returns to ACT63. Then, the processor 31 executes the processes of ACT63 and the subsequent steps in the same manner as described above.

In this way, if the processes of ACT63 and the subsequent steps are completed for the first target log data stored in the log file 332, the processor 31 determines YES in ACT70. The processor 31 exits the area specification process.

In this way, in the area specification process, it is determined whether or not the second target log data for the first target log data is stored in the log file 332. The first target log data is log data at time (T−1) smaller than the value of the first counter T by "1". The second target log data is log data including the same tag ID as that of the first target log data among log data having the value of the first counter T as a time. At least one of the antenna ID and the status of the second target log data may be different from that of the first target log data.

If the second target log data for the first target log data is stored in the log file 332, the processes of ACT66 to ACT69 are not performed. The processes of ACT66 to ACT69 are performed only if the second target log data for the first target log data is not stored in the log file 332. That is, if the tag ID of the wireless tag 2 that is read by at least one reader/writer 10 or 20 by the threshold value S number of times or more within an immediately preceding unit time is no longer to be read within an immediately subsequent unit time, confirmed data is created by using the first target log data and stored in the confirmed file 333.

The fact that the tag ID that is read within the immediately preceding unit time is no longer to be read within the immediately subsequent unit time suggests that the wireless tag 2 of that tag ID moves through the passage 300 to be transferred to the first area 100 or the second area 200.

Thus, in the confirmed file 333, confirmed data including the tag ID of the wireless tag 2 that moves through the passage 300 to be transferred to the first area 100 or the second area 200, an area name indicating a transfer destination, and transfer date and time is stored.

Therefore, by analyzing this confirmed data, it is possible to manage whether the product 3 with the wireless tag 2 moves through the passage 300 to be transferred from the first area 100 to the second area 200 or from the second area 200 to the first area 100.

Incidentally, in the present embodiment, the confirmed data stored in the confirmed file 333 is output from the movement monitoring device 30 to the product management device 40 at regular time intervals, e.g., at 1-minute intervals. In the product management device 40, the area name and the date and time of the tag record 410 are updated based on that confirmed data. Therefore, by analyzing the tag record 410 stored in the tag database 41, it is possible to accurately specify an existence area of the product 3 at a current time point.

Here, the movement monitoring device 30 constitutes the number-of-times acquisition unit by the processor 31 performing the process of ACT13 in FIG. 6. That is, the movement monitoring device 30 acquires the number of times of reading R of reading data of a wireless tag 2 by each of the plurality of antennas 11 and 21 for each unit time for each of the antennas.

The movement monitoring device 30 constitutes the strength acquisition unit by the processor 31 performing the process of ACT14 in FIG. 6. That is, the movement monitoring device 30 acquires an RSSI when data of a wireless tag 2 is read by each of the plurality of antennas 11 and 21 for each unit time for each of the antennas.

The movement monitoring device 30 constitutes the direction specifying unit by the processor 31 performing the processes of ACTs 23 to 29 in FIG. 7. That is, the movement monitoring device 30 specifies a moving direction of a wireless tag 2 passing through the passage 300 based on the number of times of reading and an RSSI for each of the antennas acquired for each unit time.

Specifically, if the movement monitoring device 30 has only one antenna whose number of times of reading is equal to or greater than a predetermined number of times in a unit time, the movement monitoring device 30 assumes that the wireless tag 2 passes in the vicinity of that antenna and specifies the moving direction of the wireless tag 2. If there are a plurality of antennas whose number of times of reading is equal to or greater than a predetermined number of times, the moving direction of the wireless tag 2 is specified by comparing RSSIs of the antennas and assuming that a wireless tag 2 passes in the vicinity of an antenna having the highest RSSI.

Here, the RSSI of each antenna to be compared when there are a plurality of antennas whose number of times of reading is equal to or greater than a predetermined number of times in a unit time is an average value when data of a wireless tag 2 is read within the unit time.

Further, the movement monitoring device 30 constitutes the area specifying unit by the processor 31 performing the processes of ACTs 61 to 70 in FIG. 9. That is, the movement monitoring device 30 specifies an existence area of a wireless tag 2 that moves through the passage 300 from a moving direction of the wireless tag 2 specified by the direction specifying unit.

Specifically, when data of the wireless tag 2 that is read by at least one antenna is no longer to be read, the movement monitoring device 30 specifies the existence area from the moving direction of that wireless tag 2 that is last specified by the direction specifying unit.

According to the wireless tag reading device 1 including the movement monitoring device 30 having such a configuration and the two antennas 11 and 21 for wireless tag communication arranged along the passage 300 through which a wireless tag 2 passes, it is possible to accurately specify a moving direction of the wireless tag 2 passing through the passage 300. In particular, in the movement monitoring device 30, the moving direction of the wireless tag 2 is specified in consideration of not only the number of times of reading for each of the antennas acquired for each unit time but also a received signal strength indicator at that time. Therefore, it is possible to specify the moving direction of the wireless tag 2 with high accuracy as compared with a conventional technique of specifying a moving direction of a wireless tag from times of communicating with the wireless tag or the number of times of reading of data of the wireless tag by a plurality of antennas.

Although an embodiment of the wireless tag reading device has been described above, the embodiment is not limited thereto.

FIG. 10 is an example of an image 50 displayed on the display device 36. The image 50 is created by log data stored in the log file 332 and confirmed data stored in the confirmed file 333.

The image 50 includes display areas 51 to 58. The display area 51 is an area for displaying a tag ID of the log data or the confirmed data. The display area 52 is an area for displaying a state of the log data. The display area 53 is an area for displaying a state of the confirmed data.

For a tag ID that exists as log data and does not exist as confirmed data, log data of the latest time is selected. Then, the tag ID of this log data is displayed in the display area 51. When an antenna ID of this log data is of the antenna 11 and the status is "1", a circle is displayed in an area ANTa on the left side of the display area 52, and a double circle is displayed in the same area ANTa when the status is "2". Similarly, when the antenna ID of the log data is of the antenna 11 and the status is "1", a circle is displayed in the area ANTb on the right side of the display area 52, and a double circle is displayed in the same area ANTb when the status is "2".

For a tag ID that exists as confirmed data, log data of the latest date and time, that is, log data for a unit time immediately before the confirmed data is created is selected. Then, the tag ID of this log data is displayed in the display area 51. When an antenna ID of this log data is of the antenna 11 and the status is "1", a circle is displayed in an area AREAa on the left side of the display area 53, and a double circle is displayed in the same area AREAa when the status is "2". Similarly, when the antenna ID of the log data is of the antenna 11 and the status is "1", a circle is displayed in an area AREAb on the right side of the display area 53, and a double circle is displayed in the same area AREAb when the status is "2".

In the display area 54, the number of tag IDs displayed in the display area 51 is displayed. In the display area 55, the number of marks displayed in the display area 52 is displayed, by areas ANTa and ANTb. In the display area 56, the number of marks displayed in the display area 53 is displayed, by areas AREAa and AREAb. A value of the first counter T is displayed in the display area 57. A unit time is displayed in the display area 58.

By displaying such an image 50 on the display device 36, the following information can be acquired in real time.

A tag ID "1111111111" is read by both the antenna 11 and the antenna 21 by the threshold value S number of times or more, and the antenna 11 has a higher RSSI average value. Therefore, a wireless tag 2 with the tag ID "1111111111" is located in the vicinity of the antenna 11.

A tag ID "2222222222" is read by the antenna 11 by the threshold value S number of times or more, and is not read by the antenna 21 by the threshold value S number of times or more. Therefore, a wireless tag 2 with the tag ID "2222222222" is located in the vicinity of the antenna 11.

A tag ID "3333333333" is no longer to be read after being read by the antenna 11 by the threshold value S number of times or more. Therefore, a wireless tag 2 with the tag ID "3333333333" exists in the first area 100.

A tag ID "4444444444" is read by both the antenna 11 and the antenna 21 by the threshold value S number of times or more, and the antenna 21 has a higher RSSI average value. Therefore, a wireless tag 2 with the tag ID "4444444444" is located in the vicinity of the antenna 21.

A tag ID "5555555555" is no longer to be read by the threshold value S number of times or more after being read by both the antenna 11 and the antenna 21 by the threshold value S number of times or more. When read by both the antenna 11 and the antenna 21, the antenna 21 has a higher RSSI average value. Therefore, a wireless tag 2 with the tag ID "5555555555" exists in the second area 200.

In the above embodiment, in ACT47 of FIG. 8, the unprocessed record X is selected if the average value Ax is greater than the average value Ay, and the unprocessed record Y is selected if the average value Ay is equal to or greater than the average value Ax. As another embodiment, the unprocessed record X may be selected if the average value Ax is equal to or greater than the average value Ay, and the unprocessed record Y may be selected if the average value Ay is greater than the average value Ax. Alternatively, the unprocessed record X may be selected if the average value Ax is greater than the average value Ay, the unprocessed record Y may be selected if the average value Ay is greater than the average value Ax, and neither may be selected if the average value Ax and the average value Ay are equal.

In the above embodiment, the number of antennas 11 and 21 arranged along the passage 300 is two. The number of antennas is not limited to two. Three or more antennas may be arranged along the passage 300. Further, a plurality of antennas may be arranged on both sides of the passage 300. In short, a plurality of antennas may be appropriately arranged according to the length, shape, etc. of the passage 300.

In the above embodiment, the movement monitoring device 30 and the product management device 40 are separate computer devices. The movement monitoring device 30 and the product management device 40 can be formed by one computer device.

The program according to the present embodiment may be transferred in a state of being stored in an electronic device, or may be transferred in a state of not being stored in an electronic device. In the latter case, the program may be transferred via a network, or may be transferred in a state of being recorded on a recording medium. The recording medium is a non-transitory tangible medium. The recording medium is a computer-readable medium. The recording medium may be any medium as long as it can store a program such as a CD-ROM or a memory card and can be read by a computer, and its form is not limited.

While certain embodiments have been described, these embodiments have been presented by way of examples only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. These embodiments and modifications thereof are included in the scope and spirit of the invention, and are also included in the invention described in the claims and the equivalent scope thereof.

The invention claimed is:

1. A wireless tag reading device comprising:
   a plurality of antennas for wireless tag communication arranged along a passage through which a wireless tag passes;
   a number-of-times acquisition unit configured to acquire a number of times the wireless tag has been read by each of the antennas for each unit time;
   a strength acquisition unit configured to acquire a received signal strength indicator when the wireless tag is read by each of the antennas for each unit time; and
   a direction specifying unit configured to specify a moving direction of the wireless tag passing through the passage based on:
   a first location of the wireless tag during a first unit time, the first location being specified based on comparison of the numbers of times the wireless tag has been read by the plurality of antennas during the first unit time with a predetermined number of times and comparison of received signal strength indicators of the antennas that are acquired for the first unit time with each other, and
   a second location of the wireless tag during a second unit time later than the first unit time, the second location being specified based on comparison of the numbers of times the wireless tag has been read by the plurality of antennas during the second unit time with the predetermined number of times and comparison of received signal strength indicators of the antennas that are acquired for the second unit time with each other.

2. The wireless tag reading device according to claim 1, wherein the direction specifying unit specifies each of the first and second locations of the wireless tag by, when there is only one antenna with which the wireless tag has been read the predetermined number of times or more, assuming that the wireless tag passes is near the antenna, and when there are a plurality of antennas with which the wireless tag has been read the predetermined number of times or more, comparing the received signal strength indicators of the antennas and assuming that the wireless tag is near an antenna with a highest received signal strength indicator.

3. The wireless tag reading device according to claim 2, wherein the received signal strength indicator of each of the antennas to be compared when there are the plurality of antennas with which the wireless tag has been read the predetermined number of times or more in the first or second unit time is an average value of signal strength values when the wireless tag is read within the first or second unit time.

4. The wireless tag reading device according to claim 1, further comprising an area specifying unit configured to specify an existence area of the wireless tag out of the passage based on the moving direction of the wireless tag specified by the direction specifying unit.

5. The wireless tag reading device according to claim 4, wherein the area specifying unit specifies, when the wireless tag has been read by none of the antennas during a third unit time later than the second unit time, the existence area based on the moving direction of the wireless tag specified by the direction specifying unit.

6. The wireless tag reading device according to claim 1, wherein the unit time is restarted each time a time-out occurs.

7. A wireless tag reading method using a wireless tag reading device in which a plurality of antennas for wireless tag communication are arranged along a passage through which a wireless tag passes, the method comprising:
acquiring a number of times of reading the wireless tag has been read by each of the antennas for each unit time;
acquiring a received signal strength indicator when the wireless tag is read by each of the antennas for each unit time; and
specifying a moving direction of the wireless tag passing through the passage based on:
a first location of the wireless tag during a first unit time, the first location being specified based on comparison of the number of times the wireless tag has been read by the plurality of antennas during the first unit time with a predetermined number of times and comparison of received signal strength indicators of the antennas that are acquired for the first unit time with each other, and
a second location of the wireless tag during a second unit time later than the first unit time, the second location being specified based on comparison of the numbers of times the wireless tag has been read by the plurality of antennas during the second unit time with the predetermined number of times and comparison of received signal strength indicators of the antennas that are acquired for the second unit time with each other.

8. A non-transitory computer-readable medium recording a control program for causing a computer of a wireless tag reading device in which a plurality of antennas for wireless tag communication are arranged along a passage through which a wireless tag passes to:
acquire a number of times of reading the wireless tag has been read by each of the antennas for each unit time;
acquire a received signal strength indicator when the wireless tag is read by each of the antennas for each unit time; and
specify a moving direction of the wireless tag passing through the passage based on:
a first location of the wireless tag during a first unit time, the first location being specified based on comparison of the numbers of times the wireless tag has been read by the plurality of antennas during the first unit time with a predetermined number of times and comparison of received signal strength indicators of the antennas that are acquired for the first unit time with each other, and
a second location of the wireless tag during a second unit time later than the first unit time, the second location being specified based on comparison of the numbers of times the wireless tag has been read by the plurality of antennas during the second unit time with the predetermined number of times and comparison of received signal strength indicators of the antennas that are acquired for the second unit time with each other.

* * * * *